US006741051B2

(12) United States Patent
Chu

(10) Patent No.: US 6,741,051 B2
(45) Date of Patent: May 25, 2004

(54) POWER TOOL TRIGGER CONTROL

(75) Inventor: Raymond Wai Hang Chu, Chai Wan (HK)

(73) Assignee: Defond Manufacturing Limited, Hong Kong (HK)

( * ) Notice: Subject to any disclaimer, the term of this patent is extended or adjusted under 35 U.S.C. 154(b) by 0 days.

(21) Appl. No.: 10/305,973

(22) Filed: Nov. 29, 2002

(65) Prior Publication Data

US 2004/0041531 A1 Mar. 4, 2004

Related U.S. Application Data

(63) Continuation-in-part of application No. 10/231,020, filed on Aug. 30, 2002, now abandoned.

(51) Int. Cl.$^7$ .................................................. H02P 3/14
(52) U.S. Cl. .................. 318/376; 318/139; 318/374; 318/375; 318/756; 388/937; 173/4; 173/5; 173/15; 173/18; 173/104; 173/148; 173/152
(58) Field of Search .................. 318/139, 374–376, 318/756; 388/937; 173/4, 5, 15, 18, 104, 148, 152

(56) References Cited

U.S. PATENT DOCUMENTS

| 4,307,325 | A | * | 12/1981 | Saar | 388/809 |
| 4,412,158 | A | * | 10/1983 | Jefferson et al. | 318/257 |
| 4,459,522 | A | * | 7/1984 | Huber | 318/293 |
| 4,756,216 | A | * | 7/1988 | Lo | 81/473 |
| 5,014,793 | A | * | 5/1991 | Germanton et al. | 173/181 |

* cited by examiner

Primary Examiner—Rina Duda
(74) Attorney, Agent, or Firm—Leydig, Voit & Mayer, Ltd.

(57) ABSTRACT

A trigger controller for an electric power tool including a motor and a pull-trigger movable along a path having a foremost home position comprises a mechanical switch and a solid-state switch connected in series to the motor, wherein the mechanical switch includes a first moving contact, and the controller includes a second moving contact wherein the first and second moving contacts are movable to operate the mechanical and solid-state switches respectively at different predetermined travelling positions of the pull-trigger from the home position such that the two switches are caused to be initially closed at different times.

18 Claims, 5 Drawing Sheets

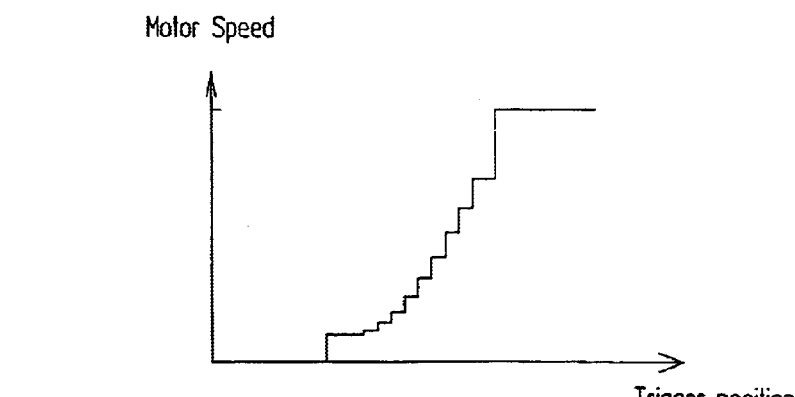
FIG. 5A
FIG. 5B
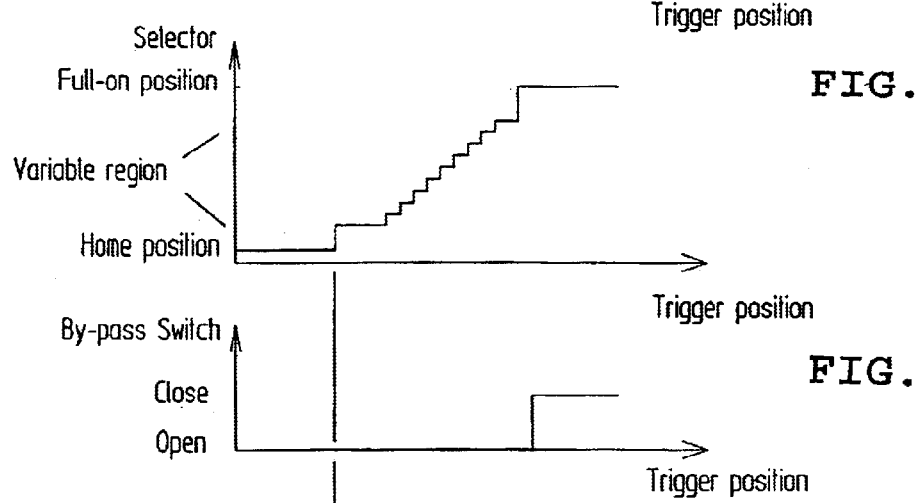
FIG. 5C
FIG. 5D
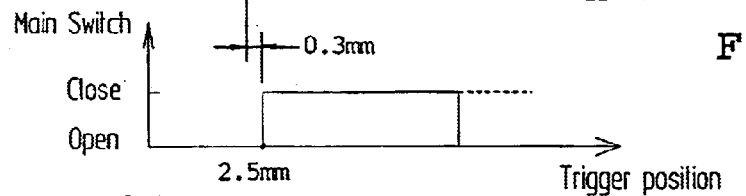
FIG. 5E
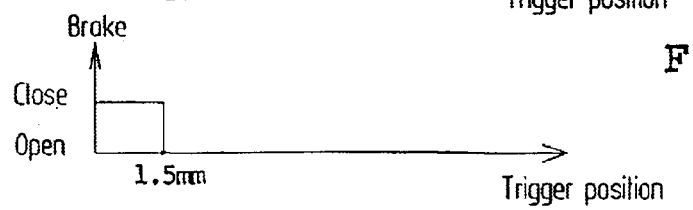
FIG. 5F

POWER TOOL TRIGGER CONTROL

This is a Continuation-in-part of prior application Ser. No. 10/231,020 filed Aug. 30, 2002, now abandoned.

The present invention relates to trigger control for an electric power tool.

BACKGROUND OF THE INVENTION

The speed of electric power tools is often controlled by means of a pull-trigger, which is used to switch on and off the motor as well as to adjust the motor speed/torque. The pull-trigger invariably incorporates an electrical switch for control, which is either a mechanical switch or a solid-state switch.

The invention seeks to provide an improved trigger controller.

SUMMARY OF THE INVENTION

According to the invention, there is provided a trigger controller for an electric power tool which is powered by a power source and includes an electric motor and a pull-trigger movable along a path for controlling the motor. The pull-trigger has a foremost home position and a predetermined full travelling distance from the home position. The controller comprising:

- a mechanical switching device and a solid-state switching device connected in series between the motor and the power source, the mechanical switching device including a first moving contact mechanically associated with the pull-trigger for movement thereby,
- control unit including an integrated circuit connected to the solid-state switching device for generating an adjustable control signal to turn on and off the solid-state switching device for delivering an electric current from the power source via the mechanical switching device to the motor, the current having an adjustable rms value, and
- an output selector including a plurality of resistors interconnected in series and a second moving contact connectable selectively to junctions of the resistors and connected to the control unit for adjusting the control signal to operate the solid-state switching device, the second moving contact being mechanically associated with the pull-trigger for movement thereby,
- the first and second moving contacts being movable by the pull-trigger to operate the mechanical and solid-state switching devices respectively at different first and second predetermined travelling positions of the pull-trigger from the home position, such that the two switching devices are caused to be initially closed at different times.

In a first embodiment, the second travelling position is downstream of the first travelling position such that the solid-state switching device is initiaily closed after the mechanical switching device.

In a second embodiment, the second travelling position is upstream of the first travelling position such that the solid-state switching device is caused to be initially closed before the mechanical switching device.

Preferably, the first and second travelling positions are different from each other by a distance substantially in the range from 1.1% to 8.1% of the full travelling distance along the path.

More preferably, the first and second travelling positions are different from each other by a distance substantially in the range from 0.1 mm to 0.5 mm of the full travelling distance along the path.

It is preferred that the first travelling position is substantially in the range from 16.7% to 61.3% of the full travelling distance from the home position along the path.

It is further preferred that the first travelling position is substantially in the range of 1.5 mm to 3.8 mm from the home position along the path.

Preferably, the first travelling position is substantially in the range from 16.7% to 61.3% of the full travelling distance from the home position along the path.

Preferably, the second moving contact is mounted on the pull-trigger for movement thereby.

It is preferred that the trigger controller includes a brake switch connected in parallel with the motor for regenerative braking, the brake switch including a moving contact mechanically associated with the pull-trigger for movement thereby.

It is further preferred that the moving contact is movable by the pull-trigger to open the brake switch at a predetermined position of the pull-trigger between the home position and the first travelling position.

It is preferred that the trigger controller includes a bypass switch connected in parallel with the mechanical and solid-state switching devices for providing a direct path from the power source to the motor, the bypass switch including a moving contact mechanically associated with the pull-trigger for movement thereby.

It is further preferred that the moving contact is movable by the pull-trigger to close the bypass switch at a predetermined position of the pull-trigger adjacent a rearmost end position thereof along the path.

More preferably, the predetermined position is substantially in the range from 5.5 mm to 7.0 mm measured from the home position.

It is preferred that the moving contact is movable by the pull-trigger to close the bypass switch after the solid-state switching device has been turned continuously on by the control unit.

It is preferred that the bypass switch and the mechanical switching device share a common moving contact that is movable by the pull-trigger to close the bypass switch after the solid-state switching device has been turned continuously on by the control unit and then to open the mechanical switching device.

The invention also provides an electric power tool which includes an electric motor and a pull-trigger movable along a path, having a foremost home position and a predetermined full travelling distance from the home position, for operating the motor, and includes, the aforesaid trigger controller.

Preferably, the electric power tool is an electric hand drill.

The invention further provides an electric power tool which includes an electric motor and a pull-trigger movable along a path, having a foremost home position and a predetermined full travelling distance from the home position, for operating the motor, and includes the aforesaid trigger controller, wherein the full travelling distance of the pull-trigger is substantially in the range from 6.2 mm to 9.0 mm.

BRIEF DESCRIPTION OF DRAWINGS

The invention will now be more particularly described, by way of example only, with reference to the accompanying drawings, in which:

FIGS. 5A to 5F are graphs illustrating the parameters of various components of a second embodiment of the trigger controller of FIG. 1 in relation to the trigger position.

DETAILED DESCRIPTION OF PREFERRED EMBODIMENTS

Figure 1:
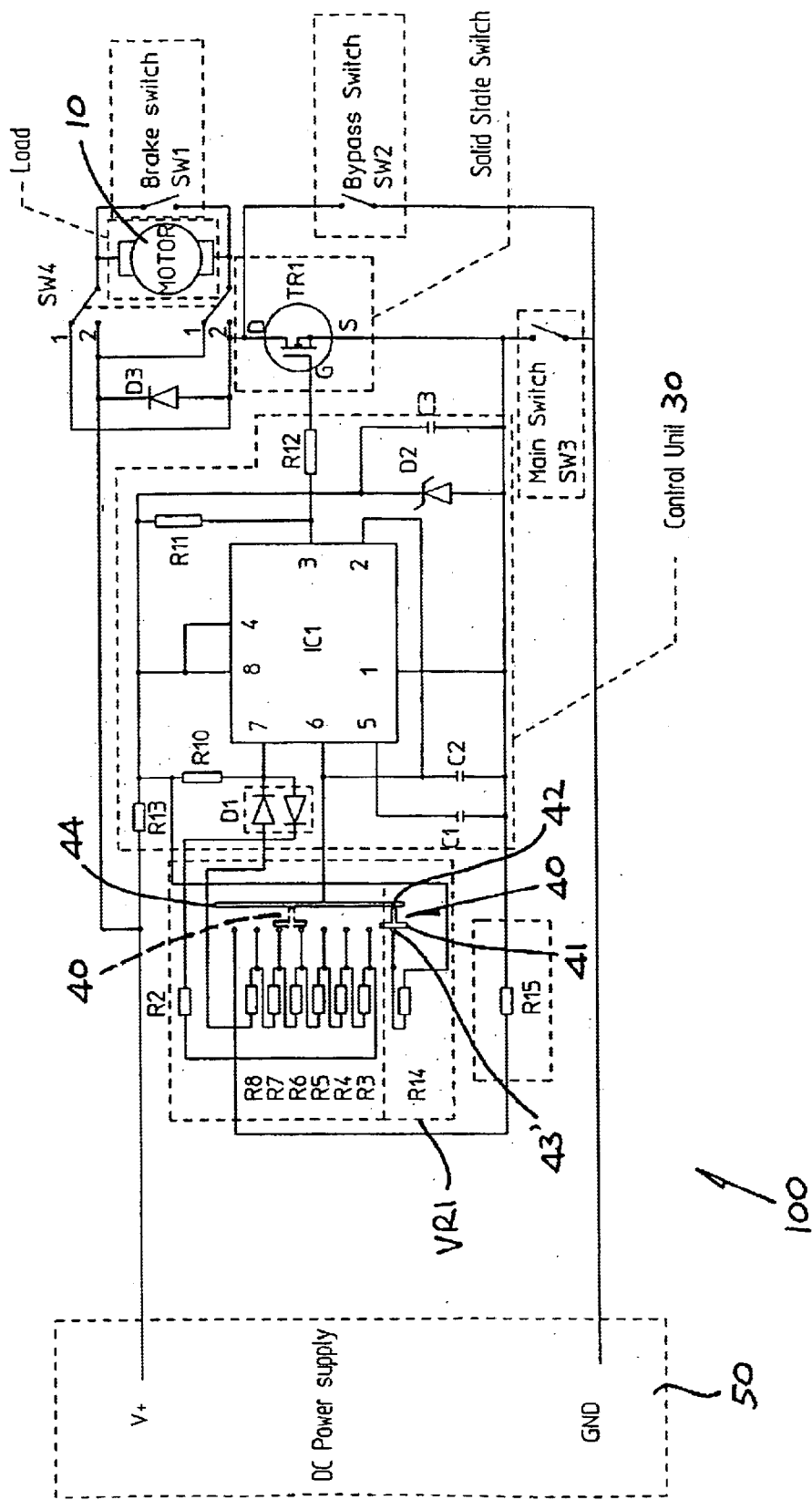
FIG. 1 is a detailed circuit diagram of a trigger controller embodying the invention, for use in a power tool.
Figure 2:
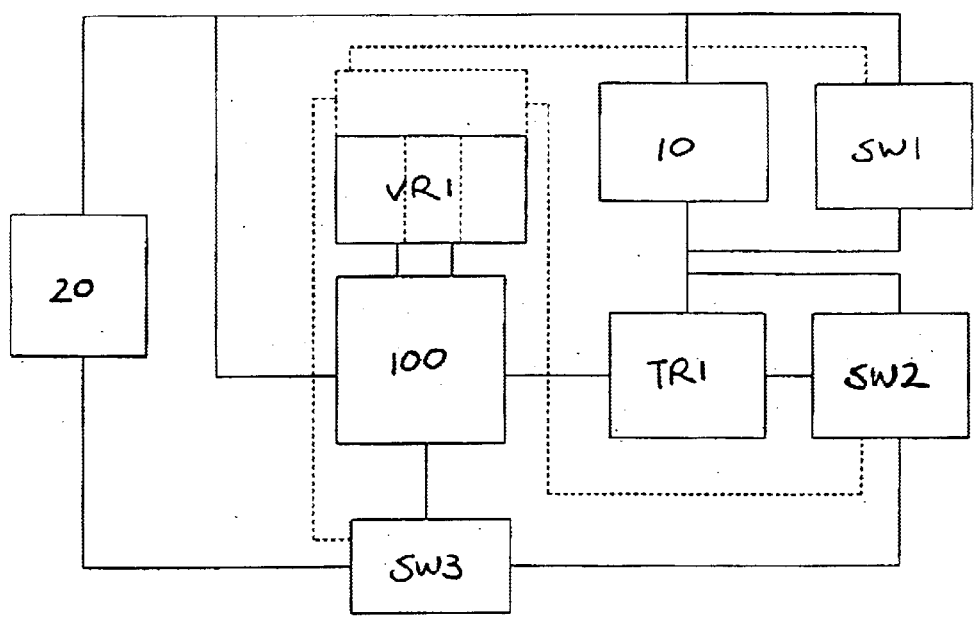
FIG. 2 is a schematic functional block diagram of the trigger controller of FIG. 1.
Figure 6:
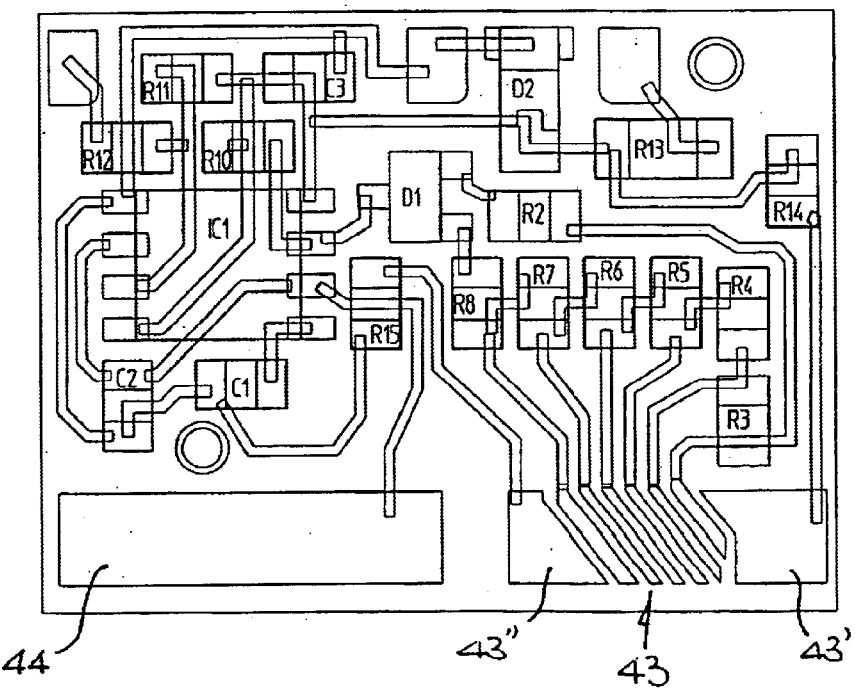
FIG. 6 shows the trigger controller circuit of FIG. 1 mounted on a printed circuit board.
Figure 3:
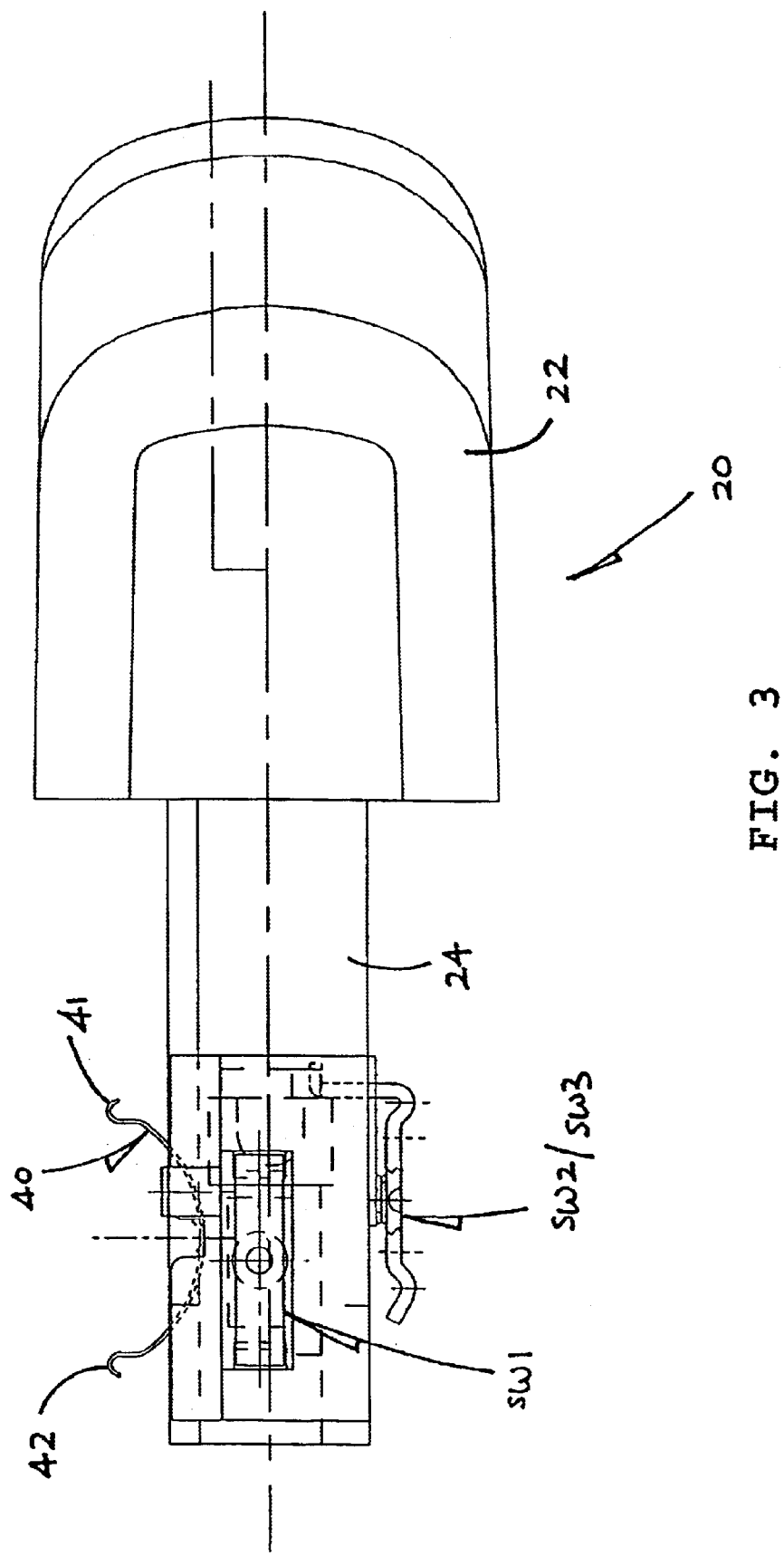
FIG. 3 is a plan view of a pull-trigger of the power tool.

Referring initially to FIGS. 1 to 3 and 6 of the drawings, there is shown a trigger controller 100 embodying the invention for controlling the operation of an electric power tool, such as a hand drill, operated by a DC power source 50, i.e. rechargeable battery pack. The power tool incorporates an electric motor (load) 10 and a pull-trigger 20 for controlling the motor 10. The trigger controller 100 comprises a solid-state switch in the form of a MOSFET transistor TR1 and a mechanical main switch SW3 which are connected in series with each other between the motor 10 and the power source 50 for controlling the power supplied to the motor 10. While the main switch SW3 is closed, the transistor TR1 switches on and off to deliver an adjustable pulsating DC current via the main switch SW3 to the motor 10 for rotation at a desired speed/torque.

A bypass switch SW2 is preferably connected in parallel with the transistor TR1 and main switch SW3 for delivering uninterruptedly the full non-pulsating DC current from the power source 50 to the motor 10 for maximum speed/torque. A reverse circuit, incorporating a 2P-2T switch SW4 and a diode D3, connects the transistor TR1 to the motor 10 for reversing the current driving the motor 10 and hence its direction or rotation. A brake switch SW1 is preferably connected in parallel with the motor 10 for speedy, regenerative braking.

The trigger controller 100 includes a control unit 30 built based on an integrated circuit chip IC1 (Model No. NE555 for example) for generating a control signal at a predetermined frequency of several 100 Hz up to 10 kHz to turn on and off the transistor TR1 for operation at that frequency. The chip IC1 has an output pin 3 connected to transistor TR1, a pair of input pins 2 and 6, and a discharge pin 7 for a capacitor C2 connected to both input pins 2 and 6.

Also included in the trigger controller 100 is a variable resistor unit acting as an output selector VR1 which is mechanically associated with the pull-trigger 20 for operation thereby and is connected to both input pins 2 and 6 of the chip IC1. The output selector VR1 adjusts the pulse width or mark-to-space ratio of the control signal at the output pin 3 of the chip IC1 and in turn the root-mean-square (rms) value of the pulsating DC current at the output of the transistor TR1 for driving the motor 10 at a corresponding speed/torque.

The pull-trigger 20 has a trigger body 22 including a stem 24, and a hollow base (not shown) that supports the stem 24 therein for sliding movement in opposite directions and houses a printed circuit board 60 on one side of the stem 24, on which the control unit 30 is mounted. The trigger body 22 is spring-loaded to stay normally in a foremost home position, and is manually slidable backwards along a linear path towards a rearmost end position. The stem 24 supports, on said one side, a moving contact 40 of the output selector VR1 for simultaneous movement thereby while bearing against the circuit board 60. The moving contact 40 has opposite, first and second ends 41 and 42.

Also supported on the trigger stem 24 are the moving contacts of the brake, bypass and main switches SW1 to SW3 for simultaneous movement thereby, such that all these switches will be operated, closed and opened as appropriate, upon movement of the stem 24 according to its position traveled to. On the contrary, the reverse switch SW4 is a separate switch for independent manual operation as required.

The output selector VR1 includes a series of seven resistors R2 to R8 connected together in series and mounted on the circuit board 60. Their junction ends are connected to a row of co-parallel inclined contact strips 43 respectively formed on the circut board 60 for selective successive contact by the first end 41 of the moving contact 40. The remaining ends of the two outer resistors R2 and R8 are connected to the discharge pin 7 of the chip IC1 via a pair of diodes D1 respectively.

The contact row includes, at opposite leading and trailing ends thereof, two additional, enlarged contacts 43' and 43", thereby totaling up to eight contacts generally designated as 43. All these contacts 43, or their adjacent edges, are inclined close together such that the first end 41 of the moving contact 40 may bridge across any two adjacent contacts 43.

The circuit board 60 includes an oblong contact rail 44 in line with the row of contacts 43 for continual contact by the second end 42 of the moving contact. 40. The contact rail 44 is connected to both input pins 2 and 6 of the chip IC1.

The output selector VR1 includes two extra resistors R14 and R15 also mounted on the circuit board 60. The resistor R14 is connected at one end to the leading contact 43' and at the other end to the discharge pin 7 but via a resistor R10. The other resistor R15 is connected at one end to the trailing contact 43" and at the other end to the junction between the transistor TR1 and the main switch SW3.

The leading contact 43' corresponds to the home position of the trigger body 22, with which the first end 41 of the associated moving contact 40 (shown in solid line in FIG. 1) is initially in contact. At the home position, both the bypass and the main switches SW2 and SW3 are open, whereas the brake switch SW1 is closed. As the trigger body 22 is pulled back to leave the home position, the brake switch SW1 will shortly be opened and the main switch SW3 be closed afterwards. The bypass switch SW2 will only be closed after the trigger body 22 has reached the end position of its full travel, i.e. after the moving contact end 41 has come into contact with the trailing contact 43".

The full travelling distance of the trigger body 22 is predetermined from the range of 6.2 mm to 8.5 mm and up to 9.0 mm as between the home and the end positions, depending on the pull-trigger design. At an intermediate trigger body position, the moving contact end 41 (for example as shown in dotted line in FIG. 1 short-circuiting the resistor R6) electrically divides the resistors R2 to R8 into a first series of resistors R7 and R8 and a second series of resistors R2 to R5.

In the direction along the path via the first resistor series R7 and R8 and one of the diodes D1, the capacitor C2 discharges into the discharge pin 7 of the chip IC1, whereby a discharging condition appears at both input pins 2 and 6. Upon the capacitor C2 discharging to a voltage below one-third of Vcc as detected by one of the input pins 2 and 6, the output pin 3 changes from low to high to turn on the transistor TR1, and the capacitor C2 enters the next charging period.

So long as the trigger body 22 stays at the home position, i.e. the moving contact end 41 being in contact with the leading contact 43', the resistor R14 acts as a pull-up resistor to keep both input pins 2 and 6 at a voltage above two-thirds of Vcc. This prevents the capacitor C2 from discharging to below one-third of Vcc, thereby maintaining the output pin 3 low and in turn the transistor TR1 off.

In the direction along the path via the resistor R10, the other of the diodes D1 and the second resistor series R2 to R5, the capacitor C2 is charged, whereby a charging condition appears at both input pins 2 and 6. Upon the capacitor C2 being charged up to a voltage above two-thirds of Vcc as detected by the other of the input pins 2 and 6, the output pin 3, changes from high to low to turn off the transistor TR1, and the capacitor C2 enters the next discharging period.

If the trigger body 22 reaches and stays at the end position, i.e. the moving contact end 41 being in contact with the trailing leading contact 43", the resistor R15 acts as a pull-down resistor to keep both input pins 2 and 6 at a voltage below one-third of Vcc. This prevents the capacitor C2 from charging to above two-thirds of Vcc, thereby maintaining the output pin 3 high and in turn the transistor TR1 on.

The discharging and charging periods of the capacitor C2 depend on the corresponding resultant resistances of the divided first and second series of resistors R2 to R8, which are in turn determined by the position of the moving contact end 41 or the trigger body 22, i.e. the trigger position. The capacitor discharging and charging periods determine the mark-to-space ratio of the control signal at the output pin 3 of the chip IC1 and in turn the root-mean-square value of the pulsating DC current at the output of the transistor TR1 driving the motor 10 at a resulting speed/torque.

Figure 4A:
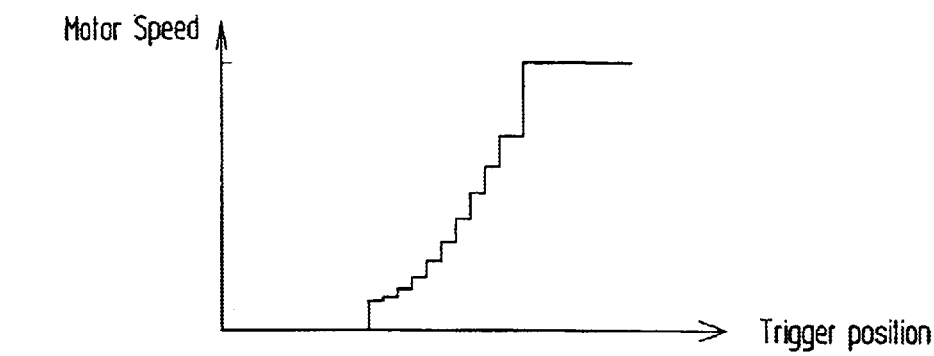
FIGS. 4A to 4F are graphs illustrating the parameters of various components of a first embodiment of the trigger controller of FIG. 1 in relation to the trigger position.
Figure 4B:
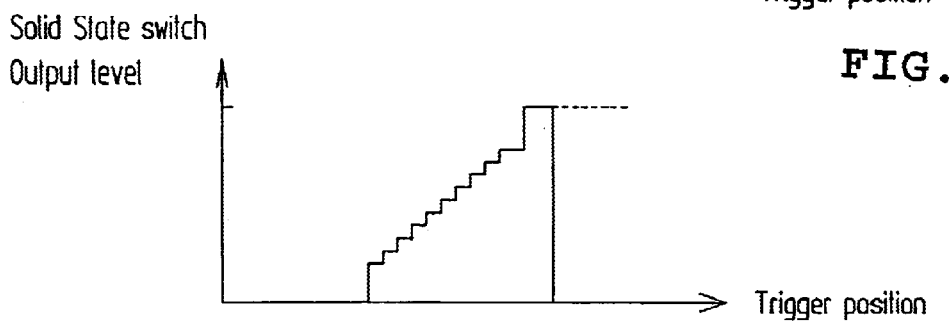
Figure 4C:
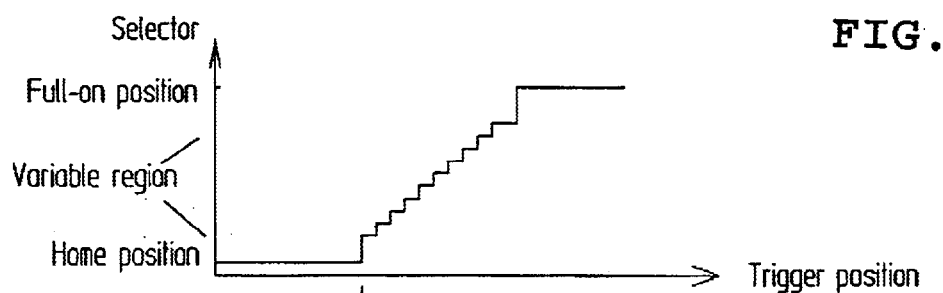
Figure 4D:
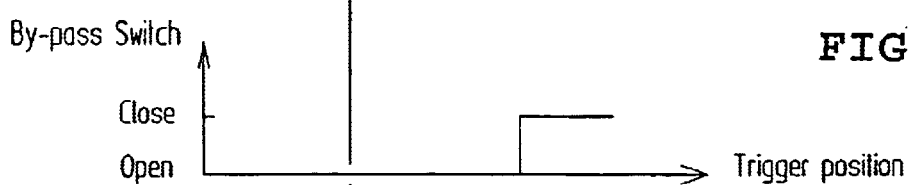
Figure 4E:
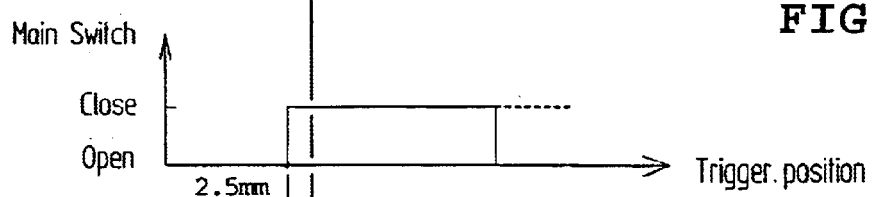

Reference is now made also to FIGS. 4A to 4F, which correspond to a first embodiment of the trigger controller 100. The moving contact of the main switch SW3 is positioned on the trigger stem 24 such that the main switch SW3 will not be closed until the trigger body 22 has travelled (pulled back) to reach a predetermined threshold position that is 2.5 mm from the home position (FIG. 4E). The threshold position is preferably in the range from 1.5 mm to 3.8 mm from the home position, or in general may be any position selected from the range of 16.7% to 61.3% of the full travelling distance.

Figure 4F:
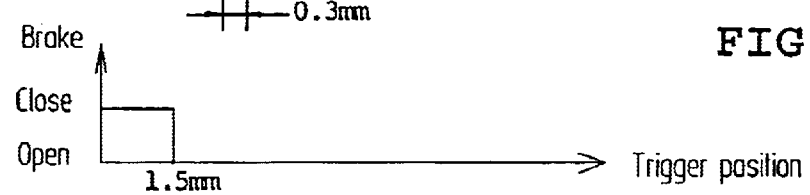

Upon the trigger body 22 travelling beyond a position that is 1.5 mm from the home position, or in general any travelling position between the home position and the threshold position, the brake switch SW1 will be opened (FIG. 4F).

The moving contact end 41 of the output selector VR1 is positioned on the trigger stem 24 such that it will leave the leading contact 43' shortly after reaching the next contact 43, in a make-before-break manner. This occurs after the trigger body 22 has travelled on for an additional distance of 0.3 mm, thereby reaching a downstream position from the threshold position (FIGS. 4C and 4E). In general, the difference in distance between the threshold and the said downstream positions is preferably in the range from 0.1 mm to 0.5 mm, or in general may be any distance selected from the range of 1.1% to 8.1% of the full travelling distance.

At the moment when the moving contact end 41 departs from the leading contact 43' while contacting the next contact 43, i.e. upon the trigger body 22 reaching the said downstream position, the pull-up resistor R14 is disconnected to enable the chip IC1 and output selector VR1 to operate, while the main switch SW3 has been closed previously. As described above, the output selector VR1 controls the charging and discharging of the capacitor C2 to cause the chip IC1 to generate a switching control signal for the transistor TR1. The transistor TR1 in turn delivers a pulsating DC current (FIG. 4B) to drive the motor 10 to rotate at a desired speed/torque (FIG. 4A).

The mechanical main switch SW3 and the solid-state transistor TR1 act as double switches connected in series to deliver driving current to the motor 10. As the main switch SW3 is susceptible to mechanical failure such as jamming and short-circuiting, the transistor TR1 provides a safety measure to cut off power to the motor 10 in case of malfunctioning of the main switch SW3.

Also, as the main switch SW3 is initially closed before the transistor TR1 comes into operation (initially closed), the switch SW3 plays no part in the initial switching on of the motor 10. When the pull-trigger 20 slides back forwards upon release, the main switch SW3 also does not take any role in the subsequent switching off of the motor 10, as it is will be opened after the transistor TR1 ceases conducting. Thus, the main switch SW3, that being a mechanical switch, will not be hampered by contact problems caused by sparking and/or flashover, etc. that would occur, or occur much more seriously, if the switch SW3 were to perform the primary switching action.

Reference is alternatively made also to FIGS. 5A to 5F, which correspond to a second embodiment of the trigger controller 100. The moving contact of the main switch SW3 is positioned on the trigger stem 24 such that the main switch SW3 will not be closed until the trigger body 22 has travelled (pulled back) to a threshold position that is 2.5 mm from the home position (FIG. 5E). The threshold position is preferably in the range from 1.5 mm to 3.8 mm from the home position, or in general may be any position selected from the range of 16.7% to 61.3% of the full travelling distance.

Upon the trigger body 22 travelling beyond a position that is 1.5 mm from the home position, or in general any travelling position between the home position and the threshold position, the brake switch SW1 will be opened (FIG. 5F).

In the second embodiment, unlike the first embodiment, the moving contact end 41 is positioned on the trigger stem 24 such that the output selector VR1 will be put into a condition be ready for operation before, rather than after, the trigger body 22 reaches the threshold position. In particular, the contact end 41 is positioned such that it will leave the leading contact 43' shortly after reaching the next contact 43 in a make-before-break manner, upon the trigger body 22 reaching an upstream position 0.3 mm in front of the threshold position (FIGS. 5C and 5E). In general, the difference in distance between the threshold and the said upstream positions is preferably in the range from 0.1 mm to 0.5 mm, or in general may be any distance selected from the range of 1.1% to 8.1% of the full travelling distance.

The output selector VR1 cannot actually come in operation until the main switch SW3 is closed. At the moment when the main switch SW3 is closed, the moving contact end 41 has already departed from the leading contact 43' and thus disconnected the pull-up resistor R14. The moving contact end 41 is also already in contact with the next contact 43 and therefore ready to cause the output selector VR1 to operate. As described above, the output selector VR1 controls the charging and discharging of the capacitor C2 to cause the chip IC1 to generate a switching control signal for the transistor TR1. The transistor TR1 in turn delivers a pulsating DC current (FIG. 5B) to drive the motor 10 to rotate at a desired speed/torque (FIG. 5A).

In comparison with the first embodiment, the mechanical main switch SW3 and the solid-state transistor TR1 remain acting as a series of double switches for safety. On the contrary, as the main switch SW3 is closed after the transistor TR1 is enabled for operation or caused to be initially closed, the main switch SW3 does perform the primary switching action. Although the main switch SW3 is susceptible to the aforesaid contact problems, its construction and/or its contact material may be improved to alleviate the problems.

An unexpected advantage is gained by enabling operation of the transistor TR1 before closing the main switch SW3. The advantage is that the travelling distance of the pull-trigger 20, over which the speed/torque is controllable, can be maximized or is not sacrificed compared with the first embodiment, especially when alteration (shortening) of the threshold position for the main switch SW3 is not intended.

In each embodiment, the bypass switch SW2 is positioned on the trigger stem 24 such that it will only be closed after the trigger body 22 has reached the end position of its full travel. As soon as the moving contact end 41 contacts the trailing contact 43", the pull-down resistor R15 comes into action and thus maintains the transistor TR1 in a full conducting state. In this condition, while the main switch SW3 remains closed, the transistor TR1 delivers the full non-pulsating DC current from the power source 50, which drives the motor 10 at maxim speed/torque.

The bypass switch SW2 is then closed to provide a direct path for the driving current, thereby relieving the transistor TR1 from handling the full driving current. The bypass switch SW2 should only be closed after the transistor TR1 has been turned continuously on by the control unit 30, for several reasons. The transistor TR1 can retain full control of the magnitude of the driving current, which is what the transistor TR1 is for. There will be no change in the magnitude of the driving current when the maximum driving current is being transferred to the bypass switch SW2. Also, at the moment of the transfer, given that the transistor TR1 is full conducting without break, the bypass switch SW2 upon closing will not be subject to any contact arcing or flashover problems.

There is a relatively short distance between the position at which the moving contact end 41 just reaches the trailing contact 43" and the position at which the trigger body 22 finally comes to a dead stop. The bypass switch SW2 may be closed at any position downstream from the first-mentioned position. After the bypass switch SW2 has been closed, the main switch SW3 may be left closed (as shown by dotted lines in FIGS. 4B and 5E), and this is intended to be the arrangement if the main and bypass switches SW3 and SW2 have separate moving contacts.

Given that the main and bypass switches SW3 and SW2 are connected together (FIGS. 1 and 3), they share common moving contact at their junction such that the main switch. SW3 is opened after the bypass switch SW2 is closed in a make-before-break manner. Opening of the main switch SW3 completely cuts off the transistor TR1.

The full travelling distance of the pull-trigger 20 is in the range from 6.2 mm to 8.5 mm and up to 9.0 mm. The distance of the pull-trigger 20 travelling to the position at which the bypass switch SW2 is closed is chosen, correspondingly, in the range from 5.5 mm to 6.5 mm and up to 7.0 mm measured from the home position.

The described power tool controlled by the subject trigger controller operates on a DC power source or battery. It is envisaged that the trigger controller may be modified for use with an AC power source, in which case the magnitude of the AC current driving the motor should be controlled by adjusting the conduction phase angle, rather than the width or mark-to-space ratio, of the cycles/pulses.

The invention has been given by way of example only, and various other modifications of and/or alterations to the described embodiments may be made by persons skilled in the art without departing from the scope of the invention as specified in the appended claims.

What is claimed is:

1. A trigger controller for an electric power tool which is powered by a power source and includes an electric motor and a pull-trigger movable along a path, having a foremost home position and a predetermined full travelling distance from the home position, for controlling said motor, the controller comprising:

a mechanical switching device and a solid-state switching device connected in series between said motor and said power source, the mechanical switching device including a first moving contact mechanically associated with said pull-trigger for movement thereby, a control unit including an integrated circuit connected to the solid-state switching device for generating an adjustable control signal to turn on and off the solid-state switching device for delivering an electric current from said power source via the mechanical switching device to said motor, the current having an adjustable rms value, and an output selector including a plurality of resistors interconnected in series and a second moving contact connectable selectively to junctions of the resistors and connected to the control unit for adjusting the control signal to operate the solid-state switching device, the second moving contact being mechanically associated with said pull-trigger for movement thereby, the first and second moving contacts being movable by said pull-trigger to operate the mechanical and solid-state switching devices respectively at different first and second predetermined travelling positions of said pull-trigger from the home position, such that the two switching devices are caused to be initially closed at different times.

2. The trigger controller as claimed in claim 1, wherein the second travelling position is downstream of the first travelling position such that the solid-state switching device is initially closed after the mechanical switching device.

3. The trigger controller as claimed in claim 1, wherein the second travelling position is upstream of the first travelling position such that the solid-state switching device is caused to be initially closed before the mechanical switching device.

4. The trigger controller as claimed in claim 1, wherein the first and second travelling positions are different from each other by a distance substantially in the range from 1.1% to 8.1% of the full travelling distance along said path.

5. The trigger controller as claimed in claim 1, wherein the first and second travelling positions are different from each other by a distance substantially in the range from 0.1 mm to 0.5 mm of the full travelling distance along said path.

6. The trigger controller as claimed in claim 1, wherein the first travelling position is substantially in the range from 16.7% to 61.3% of the full travelling distance from the home position along said path.

7. The trigger controller as claimed in claim 6, wherein the first travelling position is substantially in the range of 1.5 mm to 3.8 mm from the home position along said path.

8. The trigger controller as claimed in claim 1, wherein the first travelling position is substantially in the range from 16.7% to 61.3% of the full travelling distance from the home position along said path.

9. The trigger controller as claimed in claim 1, wherein the second moving contact is mounted on said pull-trigger for movement thereby.

10. The trigger controller as claimed in claim 1, including a brake switch connected in parallel with said motor for regenerative braking, the brake switch including a moving contact mechanically associated with said pull-trigger for movement thereby.

11. The trigger controller as claimed in claim 10, wherein the moving contact is movable by said pull-trigger to open the brake switch at a predetermined position of said pull-trigger between the home position and the first travelling position.

12. The trigger controller as claimed in claim 1, including a bypass switch connected in parallel with the mechanical and solid-state switching devices for providing a direct path from said power source to said motor, the bypass switch including a moving contact mechanically associated with said pull-trigger for movement thereby.

13. The trigger controller as claimed in claim 12, wherein the moving contact is movable by said pull-trigger to close the bypass switch at a predetermined position of said pull-trigger adjacent a rearmost end position thereof along said path.

14. The trigger controller as claimed in claim 13, wherein the predetermined position is substantially in the range from 5.5 mm to 7.0 mm measured from the home position.

15. The trigger controller as claimed in claim 12, wherein the moving contact is movable by said pull-trigger to close the bypass switch after the solid-state switching device has been turned continuously on by the control unit.

16. The trigger controller as claimed in claim 12, wherein the bypass switch and the mechanical switching device share a common moving contact that is movable by said pull-trigger to close the bypass switch after the solid-state switching device has been turned continuously on by the control unit and then to open the mechanical switching device.

17. An electric power tool comprising an electric hand drill including an electric motor and a pull-trigger movable along a path, having a foremost home position and a predetermined full travelling distance from the home position, for operating the motor, and including the trigger controller as claimed in claim 1.

18. An electric power tool including an electric motor and a pull-trigger movable along a path, having a foremost home position and a predetermined full travelling distance from the home position, for operating the motor, and including the trigger controller as claimed in claim 7, wherein the full travelling distance of the pull-trigger is substantially in the range from 6.2 mm to 9.0 mm.

* * * * *